June 28, 1960

A. W. ZIEGLER 2,942,929

DEVICE FOR RECORDING THE SPEED OF SHUTTERS
IN PHOTOGRAPHIC APPARATUS

Filed Jan. 28, 1958

INVENTOR
ARTHUR W. ZIEGLER

BY Charles D Richard
ATTORNEY

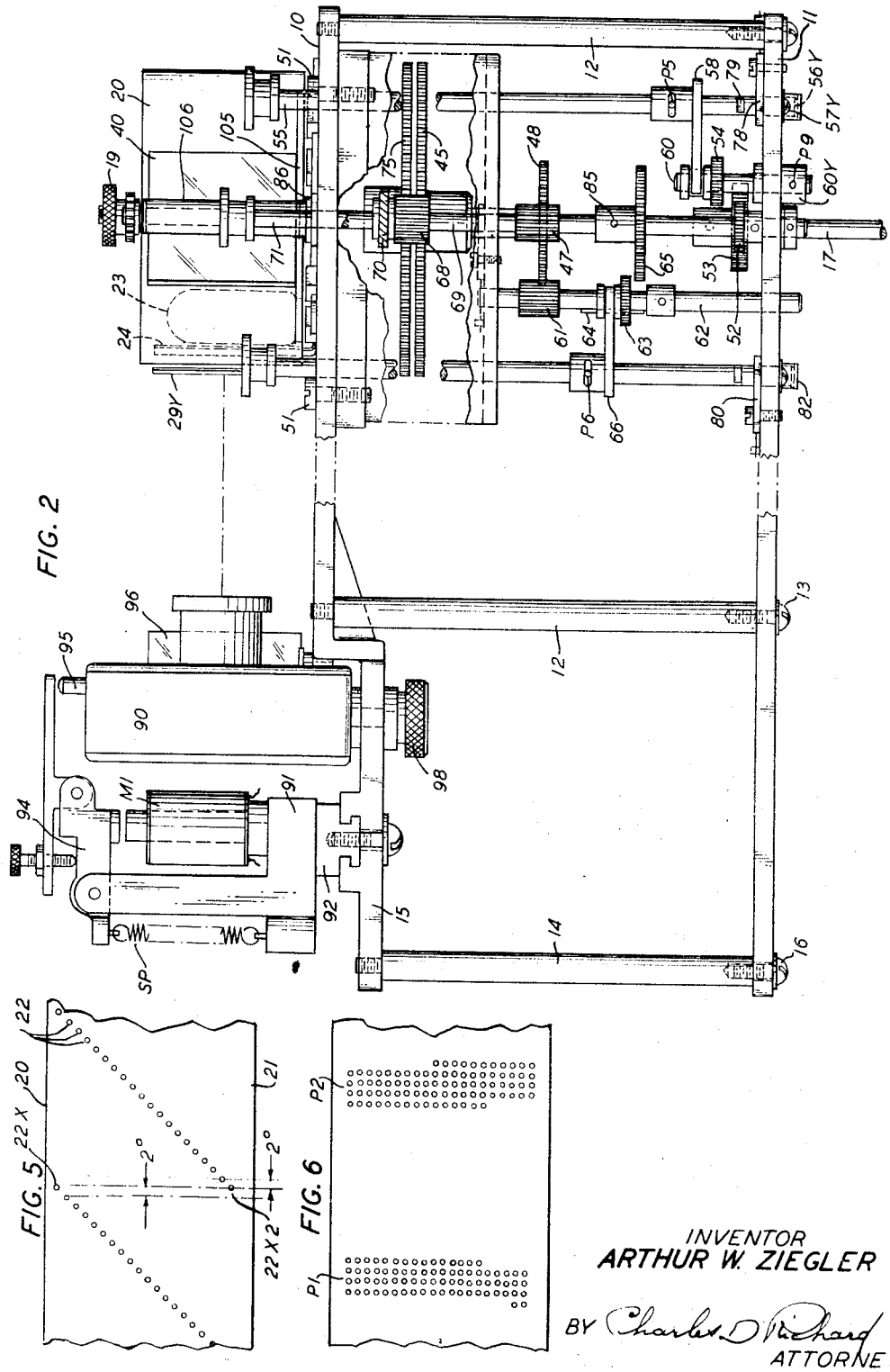

June 28, 1960  A. W. ZIEGLER  2,942,929
DEVICE FOR RECORDING THE SPEED OF SHUTTERS
IN PHOTOGRAPHIC APPARATUS
Filed Jan. 28, 1958  3 Sheets-Sheet 3
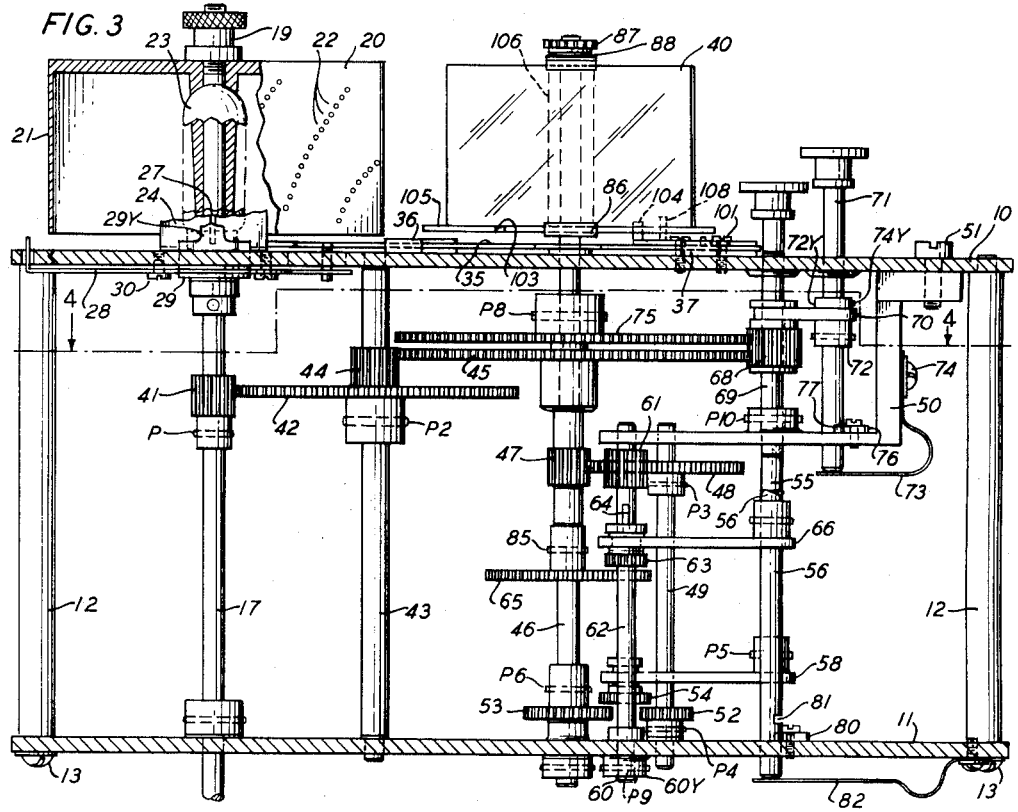
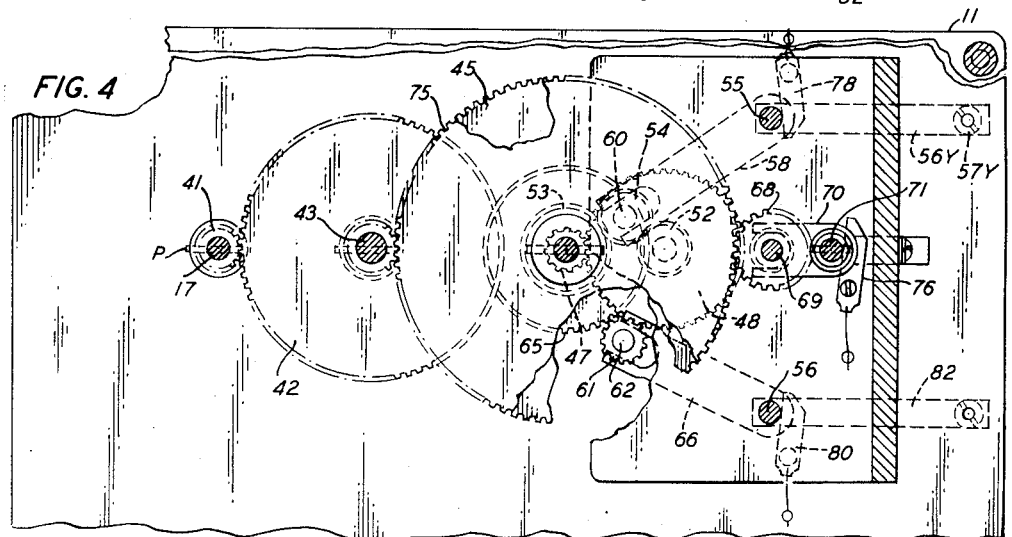
INVENTOR
ARTHUR W. ZIEGLER
BY Charles D. Richard
ATTORNEY

United States Patent Office 2,942,929
Patented June 28, 1960

2,942,929
DEVICE FOR RECORDING THE SPEED OF SHUTTERS IN PHOTOGRAPHIC APPARATUS

Arthur W. Ziegler, 47 Meadowbrook Road, Short Hills, N.J.

Filed Jan. 28, 1958, Ser. No. 711,625

10 Claims. (Cl. 346—108)

This invention has reference to a device for recording the speed of shutters in camera and like photographic apparatus.

Applicant is aware that attempts have been made to determine the speed of shutters in photographic apparatus by the use of complex and costly equipments, which have been found to require exacting manual control while in operation, and insufficiently accurate even when such equipments are attended by experienced and skilled personnel.

The object of the present invention is the provision of a device of the type above referred to, which is simple in construction, cheap to manufacture, and wherein the speed of a shutter in a photographic apparatus is recorded on a light sensitized film in an accurate manner without the aid of experienced or skilled operators.

The novel features of the invention will appear from the following description and by the claims appended thereto, reference being had to the accompanying drawing in which:

Fig. 2 is a side elevation view of the recording device with the frame shown with portions broken away to show the gearing mechanism more clearly;

Fig. 3 is a vertical sectional view taken on line 3—3 of Fig. 1, showing a number of operating parts of the recording mechanism with portions broken away, one of the keys and a gear shiftable by the movement of that key being shown in the operated position;

Fig. 4 is an horizontal sectional view taken on line 4—4 of Fig. 3 showing the gear driving mechanisms for selectively actuating a light reflecting mirror at different speed;

Fig. 5 is a developed view of a portion of the drum forming part of a light pulse generating mechanism, showing the disposition of light paths in the drum; and Fig. 6 is a view of a photographic film showing the picture of light pulses during the operation of a shutter in a photographic apparatus recorded thereon by the device of the invention.

Figure 1:
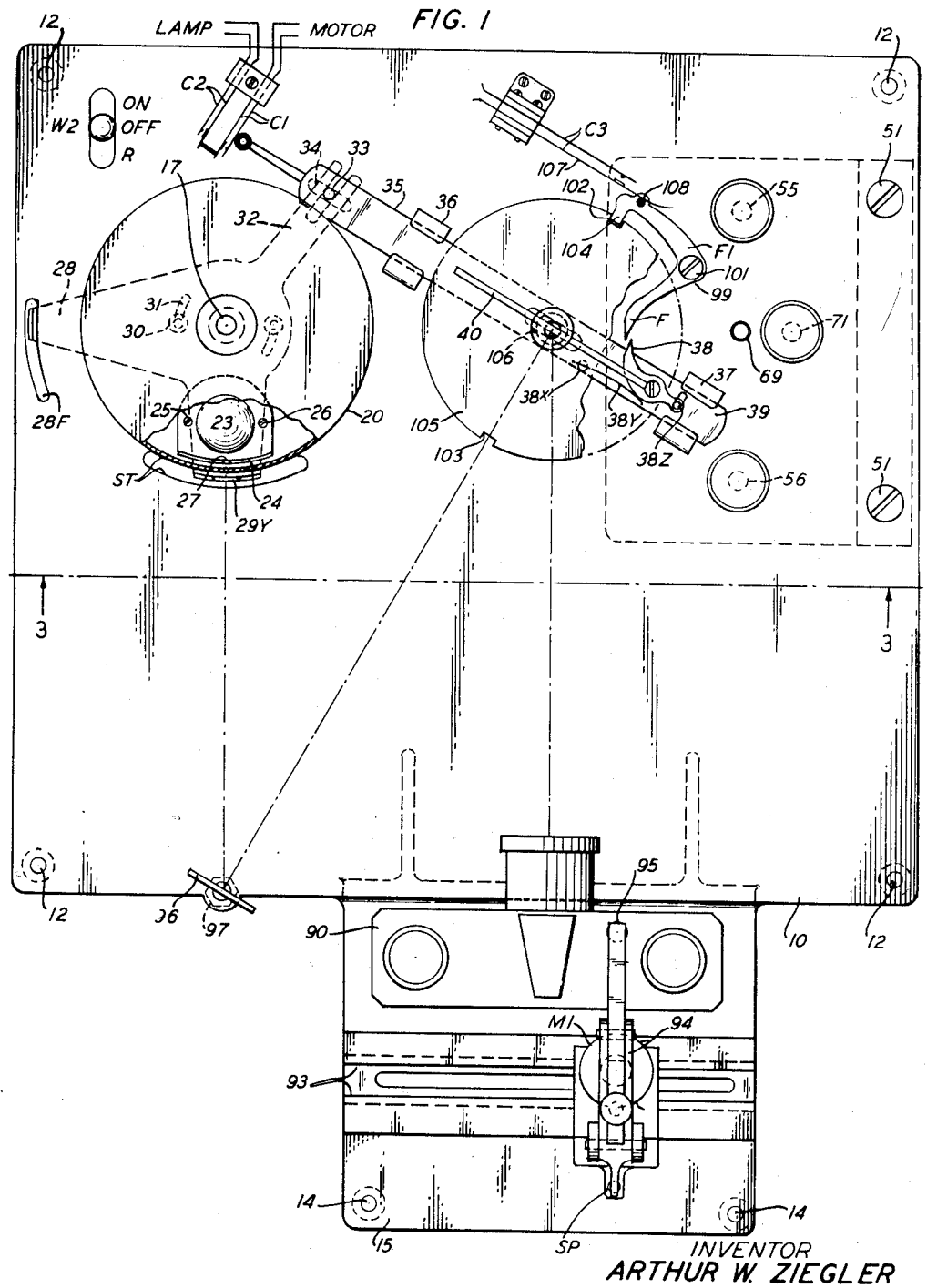
Fig. 1 is a plan view of the shutter speed recording device of the invention, showing a photographic apparatus mounted in focal adjusted position on the frame of the device, and a number of operating parts of the recording mechanism shown with portions broken away.

The shutter speed recording device of the present invention consists of a mounting frame formed of two plates 10 and 11, held in spaced relation to each other by a number of similar spacer members 12 having one of their ends screw threaded in the plate 10, and their other ends secured to the plate 11, as by screws 13, while two spacer members 14 serve to hold the free end of an extended portion 15 formed with the plate 10 in spaced relation from plate 11 to which the spacers 14 are secured, as by similar screws 16.

A shaft 17, Figs. 2, 3 and 4, is journaled in plates 10 and 11, having its lower disposed end extending a small distance from plate 11, for operatively connecting the shaft of a reversible constant speed operating motor (not shown), having in actual practice a speed of 1800 r.p.m., while the other end of this shaft, which extends above the mounting plate 10, is formed with a collar serving, in cooperation with a knob 19, for securing a bell-shaped drum 20 on this end of the shaft, the rim 21 of this drum, as best seen in Figs. 3 and 5, being provided, in the present device, with rows of holes of .050 diameter for example, disposed apart a distance of two degrees, forming light paths from a light source in the form of a lamp 23, Figs. 1, 2 and 3, vertically mounted on the plate 10 inwardly of the drum.

An arcuate upright disposed strip or plate 24 is formed with a base at right angles thereto for securing such strip to the mounting plate 10 inwardly and at close proximity of the drum, as by screws 25 and 26, while the strip 24 is provided with a vertically disposed slit 27, having a width of .050 inch, forming an elongated light path of a length corresponding to the distance between the light paths formed by hole 22x at the top of the drum and the hole 22x2 adjacent the lower edge of the rim formed drum, as shown in Fig. 5.

In the mounting plate 10 is formed an arcuate slot 28F through which the handle of a manually operable lever member 28, Figs. 1 and 3, extends. This lever member is mounted for a small angular movement on a hub 29 formed to the under side of plate 10, and this lever member is held in position thereunder by two similar screws 30 fitted in arcuate slots 31 concentric to shaft 17. Lever 28 is formed with an upward extending arm 29y projecting through a slot ST in the plate 10 in juxtaposition to the outer periphery of the drum 20 to serve as a shutter over the rows of light paths formed in the drum 20 by holes 22, and over the elongated light path formed by the slit 27 in strip 24. Lever member 28 in addition is formed, as best seen in Fig. 1, with an arm 32 forked at its free end for engaging a pin 33 extending downwardly through a slot 34 in the plate 10, with one of its ends secured to an oblong shaped bar 35 mounted for longitudinal sliding movement between guiding members 36 and 37 carried by the frame plate 10. On bar 35 is mounted a pawl 38, held normally in position shown in Fig. 1, by a spring 38y secured to the bar 35 as by a rivet 38x, while a pin 38z carried by pawl 38 extends downwardly into a slot in bar 35 for limiting the movement of this pawl in one direction against the normal tension of a retractile spring 38y, while permitting the movement of this pawl when actuated in a manner as will be hereinafter described in detail.

Pawl 38 is disposed in operative relation with the arm F of a right angle shaped lever 99 pivoted on a shoulder screw 101 engaging the mounting plate 10, while the end of the arm $F_1$ of this lever terminates in the form of a lug 104 normally engaging either one of two diametrically opposite notches 102 and 103, as the case may be, formed in a disc member 105, this disc being formed with a hub 106 loosely fitted over the upward disposed end of a shaft 46, Fig. 3, for permitting the rotation of this shaft, while the disc 105 carrying a mirror 40, silver coated on both sides, is held from rotation on shaft 46 by the lug 104 of lever 99 engaging the notch 102 of the disc.

A spring washer 88 which may be tensioned by a knob 87 which is screw threaded on the end of shaft 46, serves in cooperation with a shoulder 86 formed with the shaft 46, for frictionally driving the disc and mirror unit 40—105 upon the rotation of the shaft 46, but this unit, as above mentioned, is normally held from rotation upon the operation of shaft 46 by the lug 104 of angle lever 99 engaging the notch 102 by the tension of a spring 107 of the contact set C3, the spring 107 bearing against a pin 108 carried by the arm F1 of pawl 99.

On shaft 17 is mounted a pinion 41, Figs. 3 and 4, secured thereto as by a pin P. This pinion meshes with a gear 42 which may be formed with or secured to a pinion 44, the gear 42 in turn is secured by a pin P2 to a shaft 43 journaled in the mounting plates 10 and 11, while the pinion 44 engages a gear 45 mounted for free rotation on the shaft 46. The hub of gear 45 is formed with a pinion 47 engaging a gear 48 secured to a shaft 49 by a pin P3. This shaft is journaled at its lower disposed end in the plate 11, and its upper disposed end in a bracket 50 secured to the under side of plate 10, as by screws 51, while to the lower end of shaft 49 is secured by means of a pin P4, a pinion 52 serving for rotating the shaft 46 through a gear 53 secured to that shaft by a pin P6 upon the engagement of an idle pinion 54 movable in position for simultaneously engaging gear 52 on shaft 49 and gear 53 on shaft 46, such engagement being effected by the manual operation of a key member 55 mounted for sliding and rotary movement in bearings in the plates 10 and 11, but held in non-operated position by the tension of a retractile spring 56y, best seen in Figs. 2 and 4, secured at one end of the under side of mounting plate 11, as by screw 57y, with the free end of this spring engaging the lower disposed end portion of the key 55.

The idle pinion 54 is mounted for free rotation on a stud 60 fitted in a cylindrical projection 60y formed with the mounting plate 11 while this stud is held from rotation by a pin P9. The hub of pinion 54, as shown in Figs. 2 and 3, is formed with a circular groove engaged by a forked arm 58 which is held in position on the key 55 by a pin P5, rotary movement of shaft 46 being effected by the rotation of pinion 47 above mentioned, the gear 48, the shaft 49, the pinion 54 upon the engagement of the latter with gears 52 and 53 effected by the operation of key member 55.

The rotation of gear 48, through pinion 47, is effective to rotate a pinion 61 formed on shaft 62, journaled at one end in the bracket 50, and its other end in the plate 11, Fig. 2, and on this shaft is mounted for sliding movement a pinion 63, but held against rotation thereon by a key member 64. Pinion 63 is moved in engaged relation with a gear 65 by the operation of a manually operable key member 56 mounted for sliding and rotary movement in the plates 10 and 11, and on this key is mounted an arm 66 held from sliding movement by a pin P6. The arm 66 is forked at its free end for engaging a circular groove formed in the hub of pinion 63, Figs. 2 and 3, for moving the latter, as above mentioned, in engagement with the gear 65, itself secured on shaft 46 by a pin 85 for rotating this shaft at a speed given by the ratio of pinion 41, gear 42 rotating as a unit with pinion 44 engaging the gear 45, also rotating as a unit with pinion 47 in operative engagement with gear 48, and this gear in engagement with pinion 61 formed on shaft 62 on which the sliding pinion 63 is keyed for rotating the gear 65 and thereby shaft 46.

The key 56 is held in the operated position against the tension of a retractile spring 82 by a spring pressed pawl 80 engaging a notch 81 formed in this key, which may be released by rotating it a small angular distance for camming the pawl 80 out of engagement from the notch 81.

The gear 45, as above mentioned, is mounted for free rotation on shaft 46 and engages a pinion 68 mounted for free rotation on a shaft 69, Figs. 2, 3 and 4, fitted at its lower disposed end in the bracket 50, and at its upper end in the plate 10, while a pin P10 serves to hold this shaft against rotation in the bracket. The hub portion of pinion 68 is formed with a circular groove, best seen in Fig. 3, engaged by the forked end of an arm 70 mounted free on a key member 71 between collars 72 and 72y for permitting a small rotary movement of the key, these collars being secured to the key by similar pins 74y, the key 71 being held in the operated position by a spring pressed pawl 76 against the tension of a retractile spring 73 secured to the bracket 50 by means of a screw 74 with its free end engaging the lower end of key 71. In the position shown in Fig. 3, pinion 68 engages a gear 75 keyed to the shaft 46 for rotating this shaft according to the gear ratio from pinion 41 on shaft 17, the gear 42, pinion 44 on shaft 43, gear 45 and through pinion 68, the gear 75 secured to shaft 46 by a pin P8 for rotating the shaft 46 and thereby the disc-mirror unit 40—105 according to that speed following the manual operation of lever member 28 and thereby of bar 35 from the position shown in Fig. 1 to the position for engaging the pivoted pawl 38 with the arm F of angle lever 99 to move the lug 104 of arm F1 out of engagement from the notch 102 in the disc 105 to cause the rotation of this disc and the mirror 40 carried thereby and operating electrical contacts C2 secured on the mounting plate 10 to perform a function which will be hereinafter described in detail.

The key 71 and thereby the pinion 68 are held in the operated position by a spring pressed pawl 76 engaging a notch 77, while the release of this key from pawl 76 is effected by imparting a small angular movement to the key so as to cam off the pawl 76 out of engagement from the notch 77, the key being returned to normal non-operated position by the tension of spring 73, but with the pinion 68 remaining in engagement with gear 75.

The key 55 and the idle pinion 54 are held in the operated position by a spring pressed pawl 78 engaging a notch 79, Fig. 2, while the return movement of that key is effected by imparting a small angular movement to that key for camming the pawl 78 out of engagement from the notch 79, the key 55 being returned to normal position by the tension of spring 56y, and thereby moving the pinion 54 out of engagement from the gear 53 and pinion 52.

The projecting portion 15 of mounting plate 10 may be constructed to extend any distance from the turning axis of mirror 40 for focal adjustment of the photographic apparatus, as shown in Figs. 1 and 2, and such apparatus may be secured in adjusted position on the mounting plate extension 15 by a knob 98. The heel piece 91 of an electromagnet M1 is mounted on a base 92, itself adjustable along a transversely disposed guiding groove 93 for positioning the armature 94 of the electromagnet in engaged relation with the shutter operating knob or plunger 95 of the photographic apparatus, while a mirror 96, Fig. 1, is mounted for angular adjustment on the plate 10 relative to the light paths formed in the rim 21 of drum 20 and the slit 27 in strip 24 in line with the turning axis of mirror 40 and may be secured in adjusted position thereon by a nut 97.

In a typical operation of the shutter speed recording device of the invention, with the photographic apparatus on the mounting frame in the position shown in Figs. 1 and 2, the operation of lever member 28 an angular movement defined by the length of slot 28F is effective to move the bar 35 in position to close the normally open contact C1 to cause the operation of the synchronous motor for rotating the shaft 17 and the drum 20 secured to the top disposed end thereof at a speed of 1800 revolutions per minute. Rotation of shaft 17 is effective to rotate the mirror 40 when the latter is released by the continued operation of bar 35 for actuating the angle lever 99, as above mentioned, the mirror being geared for operation at a speed of .25 revolution per second upon the operation of key member 71 in its locked position through the pinion 41, the gear 42 mounted on shaft 43 for rotation as a unit with pinion 44, which in turn actuate the shaft 46 carrying the mirror 40 through the gears 45 and 75, both engaged by pinion 68 which, as above mentioned, is mounted for free rotation and sliding movement on shaft 69.

Another mirror speed of .075 revolution per second is provided for recording the speed of slower operating shutters as obtained through the rotation of shaft 17, pinion 41, gear pinion unit 42–44, the gear 45 mounted for free rotation as a unit on shaft 46, the gear 48 in engagement with pinion 47 and the pinions 61 and 63 when the latter has been moved in engagement with gear 65 by the manual operation of key member 56, but it is to be noted that the pinion 68 has been disengaged from gear 45 and held in the disengaged relation by the spring 82 bearing against the lower end of that key member.

A third mirror speed of .0375 revolution per second is obtained through the pinion 41, gear pinion unit 42–44, gear 45, pinion 47, gear 48 on shaft 49, the pinion 52 also secured on shaft 49, the gear 53 secured on shaft 46 and pinion 54 mounted on stud 60 when this pinion has been moved in engagement with the pinion 52 and gear 53 by the operation of key member 55 carrying the arm 58.

The recording of the operating speed of an in-between the lens shutter for example on a film in an ordinary photographic apparatus may be effected by moving the lever member 28 so as to impart a longitudinal movement to the bar 35 to close the contact C1 and thereby causing the energization of the motor which, as above mentioned, operates at the rate of 1800 revolutions per minute, while the continued longitudinal movement of this bar is effective to close the contact C2 for energizing the lamp 23 and move the shutter 29y formed with lever 28 out from the light paths formed by the slit 27 in strip 24 and the light paths formed in the drum 20 to remain out of the light paths position to the completion of a shutter speed recording operation when the lever 28 is manually returned to normal position, but it is to be noted that the light pulses thus transmitted are ineffective since the shutter of the photographic apparatus has not been operated. The continued movement of bar 35 as above mentioned is also effective to engage the pawl 38 pivoted thereon with the arm F of angle lever 99 to cause the pivotal movement of this lever and thereby move the lug 104 out of engagement from the notch 102 in the disc 105 for permitting the rotation of this disc and the mirror 40 carried thereby half a turn for reflecting the light pulses thus generated onto the lens of the photographic apparatus, the release of the mirror being effected simultaneously with the closure of the contact C3 by the pivotal movement of angle lever 99 for causing the energization of electromagnet M1, Figs. 1 and 2, which attracts its armature against the tension of a retractile spring SP to operate the plunger 95 of the photographic apparatus in timed relation with the release of disc mirror unit 40–105 as above mentioned by the pivotal movement of lever 99, the contact spring C3 and angle lever 99 remaining in the operated position held at the periphery of disc 105 until the notch 103 formed in this disc in position diametrically opposite the notch 102 passes in registry with the lug 104 of angle lever 99, following the recording of the light pulses onto the film in the photographic apparatus during the operation of the shutter therein in the dot pattern P1, for example, in the testing of a so-called in-between the lens shutter or in the patterns P1 and P2, as in the speed testing operation of a focal plane shutter as shown in Fig. 6 on a film in the photographic apparatus, and the device is now ready for a successive recording operation following the return of the manually operated lever member 28 and thereby the bar 35 in normal non-operated position, as shown in Fig. 1, when the pawl 38 is cammed downwardly by its engagement with the arm F of angle lever 99 thus stopping the operation of the motor, de-energizing the lamp 23 and returning the shutter 29y carried by the lever member 28 over the light paths in the drum which may be in registry with the light path in the strip 24.

The reverse of the wire connections for the motor and the energization of the lamp 23 may be switched to any of the desired On-Off and Reverse operating position by a switching device W2 connected to contact C1, in the well known manner. It is to be noted that the three mirror speeds above mentioned have been found to be sufficient for the testing of all shutter speeds used in the photographic apparatus presently in use. In each testing operation the number of light dots printed or recorded on the film of a photographic apparatus is an indication of the operating speed of the shutter tested. For example, considering the pattern P2 obtained as a result of the testing of an in-between lens shutter which shows 86 light dots, each of these dots has an elapsed time value of $\frac{1}{5400}$ second or .000185. Therefore this shutter took 86 × .000185 second to operate, or .01591 second expressed in decimals or $\frac{1}{63}$ second expressed in fractions of a second. In the testing of a focal plane shutter pattern P2, as above mentioned, shows 86 light dots and P1 shows 77 light dots added to the 86 dots of the P2 pattern=163 divided by 2=81.5, each dot again has an elapsed value of .000185 second. Therefore this focal plane shutter took 81.5 × .000185 second to operate, or .0151 second expressed in decimals or $\frac{1}{151}$ or $\frac{1}{66}$ second approximately expressed in fractions. In each testing operation the result thus obtained may be compared with the set shutter speed of the photographic apparatus.

In the recording of the speed of a focal plane shutter, because of the fact that a greater number of light dots are printed onto the film when the slit of the shutter in the photographic apparatus moves in the direction of the mirror the drum 20 and the mirror geared thereto are rotated (first) in a clockwise direction to obtain a series of light dots which may be in the pattern or in number as shown at P2 in Fig. 6, whereas the successive speed recording operation of the same shutter, the drum and the mirror, are rotated in a counter-clockwise direction that is in a direction opposite to the operation of the shutter of the photographic apparatus by the operation of switch W2 to the R or reverse position so as to obtain a light dot record of the type shown at P1 added to the record P2 and then taking the average by dividing the number of dots by two as to obtain a true record of the operating time of the operation of the focal plane shutter in the photographic apparatus.

In any shutter speed testing operation, an angular movement of approximately 20° out of 180° or each half of a turn of the mirror is used in projecting the light spots onto and across the lens of the photographic apparatus. For the fastest speed of a shutter to be tested, the time allowed for calibrating when shaft 46 is operated directly through the pinion 41, gear pinion unit 42–44 and gears 45 and 75, both in engagement with pinion 68 upon the operation of key 71, is $\frac{4}{18}$ or .222 seconds, and this speed is used for calibrations from $\frac{1}{1000}$ sec. to $\frac{1}{10}$ second. The time allowed for calibration at the second speed, upon the operation of key 56 is $$13.33/18 = .741$$

seconds used for recording shutter speed of ¼ and ½ second, while the recording at the third speed, upon the operation of key 55 is 26.66/18=1.482 seconds for calibrating shutter speed of approximately one second, any of the gear ratios above described may be used, depending upon the type of photographic apparatus the shutter speed of which it is desired to record, thus avoiding the use of a different recording apparatus for each shutter speed.

It is understood that minor changes such as the use of different mirror speeds and different number of light paths in the drum may be made to the invention without departing from the scope of the appended claims.

What I claim is:

1. A device for recording the speed of a shutter in a photographic apparatus, said device comprising a rotatable drum having light paths at its periphery, a lamp in said drum, a normally non-operating rotatable mirror, a stationary mirror disposed in the field of the light paths in said drum for reflecting the light pulses onto said rotatable mirror for reflecting such light pulses onto the lens of the photographic apparatus, normally open sets of electrical contacts, manually operable means for closing contacts in one of said sets to cause the operation of said drum and said rotatable mirror, and electromagnetic means operable by the closure of the other of said contacts in another of said sets to cause the operation of the shutter in the photographic apparatus in timed relation with the operation of said drum for recording the number of light pulses onto a film in the photographic apparatus.

2. A device for recording the speed of a shutter in a photographic apparatus, said device comprising a constant speed motor, a rotatable drum geared to said motor having light paths at its periphery, a lamp in said drum for generating a series of light pulses upon the operation of said drum, a stationary mirror disposed in the field of said light pulses, a rotatable mirror geared to said drum cooperating with said stationary mirror for reflecting the light pulses onto the lens of the photographic apparatus, an electromagnet having its armature disposed in operative relation with the shutter actuating plunger of the photographic apparatus, sets of electrical contacts, manually operable means for actuating one set of said contacts to cause the energization of said motor and another set for energizing said lamp in timed relation with the operation of another of said sets of said contacts for energizing said magnet for operating the shutter of the photographic apparatus for recording the light pulses reflected by said rotatable mirror onto a film in such apparatus.

3. A device for recording the operating speed of a shutter in a photographic apparatus having a plunger for actuating such shutter, said device comprising a constant speed motor, a normally open set of contacts connecting with said motor, light pulse generating means operatively connected to said motor, said generating means comprising a rotatable drum having light paths at its periphery, a lamp disposed in said drum, a pair of normally open contacts connecting with said lamp, a stationary mirror in the field of the light paths from said drum, a rotatable mirror geared to said motor for reflecting the light from said stationary mirror onto the lens of the photographic apparatus, means for frictionally holding the last mentioned mirror from rotating upon the operation of said motor, an electromagnet having its armature disposed in operative relation with the plunger in the photographic apparatus, a set of normally open contacts connecting with said magnet, and manually operable means for successively closing the contacts of said motor, the contacts of said lamp operating said holding means to cause the operation of said rotatable mirror, and closing the contacts of said magnet for operating the shutter of the photographic apparatus for recording the light pulses from said generating means onto a film in the photographic apparatus.

4. In a device for recording the speed of a shutter in a photographic apparatus, the combination which consists of normally non-effective means for generating light pulses according to a constant speed actuating mechanism, means operable for reflecting the light pulses from said light pulse generating means onto the lens of the photographic apparatus, a plunger operable to cause the operation of such shutter an electromagnet having its armature disposed in operative relation with the plunger in the photographic apparatus, a plurality of sets of normally open contacts, and means manually operable for actuating said contacts in said sets successively to render said light pulse generating means effective and said light reflecting means effective in timed relation to each other and in timed relation with the closing operation of the contacts of said magnet for operating the shutter in the photographic apparatus for recording the light pulses onto a film therein.

5. A device for recording the speed of a shutter on a film in a photographic apparatus having a plunger for actuating such shutter, said device comprising a base, a constant speed motor mounted on said base, a drum actuated by said motor having light paths at its periphery, a mirror geared to said drum, a lamp mounted on said base inwardly of said drum for generating light pulses upon the rotation of said drum, manually operable stop means for normally holding said mirror from operating upon the rotation of said drum, a stationary mirror disposed in the field of light from said drum for reflecting the light onto said rotatable mirror, an electromagnet having its armature disposed in operative relation with the plunger in the photographic apparatus, a set of normally open contacts for said magnet closed by the operation of said stop means following the release of said mirror to cause the operation of the plunger in the photographic apparatus for projecting the light pulses emanating from said drum onto a film in such photographic apparatus.

6. A device for recording the speed of a shutter in a photographic apparatus having a plunger for actuating such shutter, said device comprising a constant speed motor, a set of normally open contacts connecting with said motor, a drum actuated by said motor, said drum having a plurality of light paths disposed at equal spaced relation to each other in rows oblique relative to the turning axis of said drum, a lamp in said drum, a set of normally open contacts connecting with said lamp, a shutter plate disposed in juxtaposition to the periphery of said drum inwardly thereof, said plate having an elongated light path disposed in parallel relation to the turning axis of said drum and common to said light paths in said drum for generating light pulses upon the passing of said light paths in registering relation to said elongated light path in said plate, a system of mirrors, an electromagnet having its armature in operative relation with the plunger of the photographic apparatus, a set of normally open contacts for said magnet, means manually operable for successively closing the first mentioned set of said contacts for energizing said motor, closing the second mentioned set of said contacts for energizing said lamp, causing the operation of one of said mirrors for reflecting the light from said drum onto a lens in the photographic apparatus, and closing the third mentioned set of contacts for energizing said magnet and thereby causing the operation of the plunger in the photographic apparatus for recording the number of pulses onto a film in such apparatus.

7. A device for recording the operating speed of a shutter in a photographic apparatus, said device comprising a cylindrically shaped rotatable member, a lamp disposed inwardly of said rotatable member, a plurality of light paths carried by said member disposed in oblique relation to the turning axis thereof in rows at equal spaced relation to each other, constant speed actuating means for said rotatable member, a stationary plate disposed in juxtaposition to said member having a slit forming a light path intersecting with the light paths in said rotatable member successively upon the operation of said member, a rotatable mirror, a stationary mirror disposed in the field of said light paths for reflecting the light onto said rotatable mirror, a gear reduction mechanism operatively connecting said rotatable mirror to said member for reflecting the light onto the lens of the photographic apparatus, an electromagnet having its armature disposed in operative relation with the shutter in the photographic apparatus, means manually operable to cause the energization of said magnet in timed relation with the operation of said member and of said rotatable mirror for projecting the light pulses generated upon the rotation of said member onto a film in the photographic apparatus.

8. A device for recording the speed of a shutter in a photographic apparatus having a plunger for actuating such shutter, said device comprising a light pulse generating mechanism, a constant speed motor for actuating said mechanism, a stationary mirror disposed in the field of the light pulses generated by said mechanism, a normally rotatable mirror for reflecting the light from said stationary mirror onto the lens in the photographic apparatus upon the operation of said mechanism, a manually operable key member for operatively connecting said operable mirror to said light pulse generating mechanism, a disc-shaped member movable as a unit with said mirror having stop elements at its periphery for limiting the operation of said mirror following each pulse recording operation, means cooperating with said stop elements for normally holding said mirror from rotation upon the operation of said light pulse generating mechanism, an electromagnet having its armature disposed in operating relation with the plunger in the photographic apparatus, a set of normally open contacts for said magnet, and a handle lever for actuating said means for closing said contacts for energizing said magnet and thereby causing the operation of the plunger in the photographic apparatus in timed relation with the release of said rotatable mirror for reflecting the light pulses from said stationary mirror onto the lens of the photographic apparatus for recording the number of such light pulses onto a film in such apparatus during the operation of the shutter.

9. A device for recording the speed of a shutter in a photographic apparatus, said device comprising a rotatable drum, a constant speed motor for actuating said drum, a lamp mounted inwardly of said drum, a normally stationary rotatable mirror, a multiple speed mechanism for selectively operatively connecting said rotatable mirror to said drum, said drum having rows of light paths formed in the rim thereof disposed at equal spaced relation to each other, a plate mounted in juxtaposition to the inner periphery of said drum having a slit therein forming a light path intersected by the successive light paths in said drum for generating light pulses, a stationary mirror disposed at an angle relative to the field of light from said drum to be reflected onto said operable mirror, electromagnetic means for actuating the shutter in the photographic apparatus, normally open contacts operable to cause the energization of said electromagnetic means, and means manually operable to cause the operation of said operable mirror according to the selected speed in timed relation with the closing operation of said normally open contacts and thereby the operation of the shutter in such apparatus for transmitting a number of light pulses generated by the operation of said drum onto a film in the photographic apparatus for recording such light pulses.

10. A device for recording the speed of a shutter in a photographic apparatus having a plunger for actuating such shutter, said device comprising a constant speed motor, a rotatable member actuated by said motor having light paths, a stationary plate disposed in juxtaposition to said member having a slit therein forming a light path intersecting the light paths in said member upon the rotation of said member, a lamp cooperating with said member for generating series of light pulses a stationary mirror, a rotatable shaft geared to said member, a mirror-disc unit mounted on said shaft, friction means operatively connecting said unit to said rotatable shaft, said rotatable mirror cooperating with said stationary mirror for reflecting the light pulses onto the lens in a photographic apparatus, manually operable stop means cooperating with means carried by said disc for holding said unit from rotating upon the operation of said member, an electromagnet having its armature disposed in operative relation with the plunger in the photographic apparatus, sets of normally open electrical contacts closed successively by the operation of said manually operable means, the operation of the contacts in one of said sets causing the energization of said motor for actuating said member, the operation of other contacts in another set by the continued movement of said manually operable means causing the energization of said lamp, and means actuated by the operation of said manually operable stop means to cause the operation of said disc-mirror unit and simultaneously closing the contacts in another of said sets to cause the energization of said magnet for operating the plunger in the photographic apparatus and thereby the shutter therein for recording the number of pulses generated by the operation of said member and the energization of said lamp upon a film in such apparatus.

References Cited in the file of this patent

UNITED STATES PATENTS

| | | |
|---|---|---|
| 808,384 | Kershaw | Dec. 26, 1905 |
| 1,431,897 | Riddell | Oct. 10, 1922 |
| 2,102,708 | Howle | Dec. 21, 1937 |
| 2,296,676 | Kearsley | Sept. 22, 1942 |

FOREIGN PATENTS

| | | |
|---|---|---|
| 400,100 | Germany | Aug. 15, 1924 |